United States Patent

Silva

[15] 3,688,532
[45] Sept. 5, 1972

[54] CONTROL SYSTEM FOR TANDEM ROLLING MILL BASED ON THE CONSTANT VOLUME PRINCIPLE

[72] Inventor: Antonio Vicente Silva, c/o Westinghouse Electric S.A., Coxie Postal 5156, San Paulo, Brazil

[22] Filed: Nov. 24, 1970

[21] Appl. No.: 92,349

[52] U.S. Cl. ............................................72/8, 72/16
[51] Int. Cl. .............................................B21b 37/12
[58] Field of Search....................72/6, 12, 16, 19, 21

[56] References Cited

UNITED STATES PATENTS

| | | | |
|---|---|---|---|
| R25,075 | 10/1961 | Hessenberg | 72/9 |
| 3,531,961 | 10/1970 | Dunn | 72/8 |
| 3,564,882 | 2/1971 | Harbaugh et al. | 72/8 |
| 3,507,134 | 4/1970 | Silva | 72/8 |
| 3,170,344 | 2/1965 | Marrs | 72/11 |
| 3,169,421 | 2/1965 | Bloodworth | 72/11 |

*Primary Examiner*—Milton S. Mehr
*Attorney*—F. H. Henson, R. G. Brodahl and J. J. Wood

[57] ABSTRACT

Automatic gauge control system for tandem rolling mills based on the constant volume principle. The percentage gauge deviation from desired gauge at the output side of a first stand in a tandem mill is derived and stored until the off-gauge material reaches the bite of the rolls of a succeeding stand; whereupon the first stand speed is increased or decreased by an amount equal to the percent gauge deviation from the desired gauge at the output of the first stand. Tensiometer means are provided between the first and second stands for controlling the screwdown on the second stand in a manner such that when the speed of the first stand is varied in response to a deviation in gauge from desired gauge, the tension between the stands is also varied as is the screwdown on the second stand to compensate for the tension variation. The adjustment to the screwdown on the second stand, in addition to maintaining tension constant, also compensates for off-gauge material.

9 Claims, 1 Drawing Figure

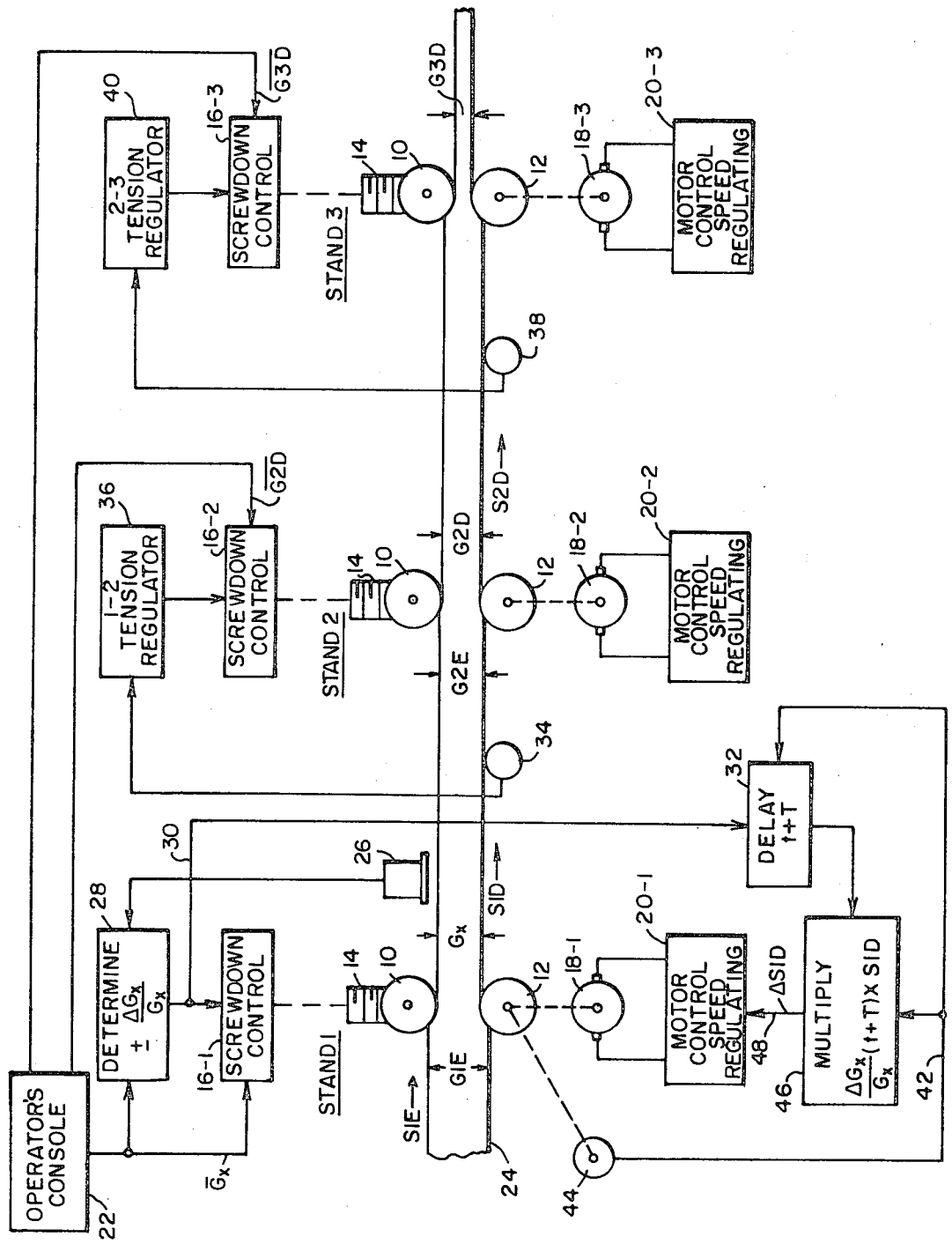

CONTROL SYSTEM FOR TANDEM ROLLING MILL BASED ON THE CONSTANT VOLUME PRINCIPLE

BACKGROUND OF THE INVENTION

In many control systems for rolling mills used in the past, a mill screwdown was controlled from a gauge measurement taken several feet beyond the exit side of the mill. In a system employing a gauge measurement of this type the material, after reduction, progresses to the gauge which may be several feet beyond the bite of the mill before any error present in the material thickness can be detected. This distance from the bite of the rolls to the gauge is commonly referred to as "transport distance". The time required for the material to reach the exit gauge is denoted as "transport time". Transport distances of 5 feet or more are common, meaning that the gauge which detects material thickness is positioned at least 5 feet beyond the bite of the rolls. Consequently, systems of this type are not capable of detecting an error signal until 5 feet of material have passed from the bite of the mill rolls. The corrective signal is then transmitted to the mill screwdown; but the measuring gauge will not detect the result of this action until 5 more feet of the material have passed through the mill. As a result, control systems of this type which attempt to adjust gauge "after the fact" are not altogether satisfactory.

Systems based on the constant volume principle have been devised for eliminating transport distance and transport time. One such system, for example, is shown in Orbom et al. U.S. Pat. No. 3,051,974, issued Jan. 9, 1962. The constant volume principle is based on the measurement of entry gauge of material entering a stand in a mill, the measurement of the entry and delivery strip speeds at this stand, and the computation of delivery gauge by utilizing the constant volume flow equation:

$$S_1 G_1 = S_2 G_2 \quad (1)$$

where:

$S_1$ = speed of the material entering the bite of the rolls;
$G_1$ = gauge of the material entering the rolls;
$S_2$ = speed of the material leaving the rolls; and
$G_2$ = gauge of the material leaving the rolls. In other words, the control system is based upon the proposition that the volume (i.e., $S_1 G_1$) of the material entering the bite of the rolls must be equal to the volume (i.e., $S_2 G_2$) of material leaving the bite of the rolls.

The parameter to be controlled, of course, is the exit gauge $G_2$; and this may be entered into the system as an electrical signal proportional to desired exit gauge, $G2D$. Furthermore, an error signal for the rolling mill screwdown can be derived by calculating the desired input gauge from the variables $S_1$, $S_2$ and $G2d$ and comparing this calculated desired input gauge with the actual measured value of input gauge. That is:

$$\text{Error} = G_1 - (S_2/S_1) G2d \quad (2)$$

From the foregoing Equation (2), it can be seen that in order to derive an error signal for the rolling mill screwdown, the input gauge $G_1$ at the entrance side of the mill must be measured and converted into a proportional electrical signal; the desired exit gauge $G2d$ must be entered as a proportional electrical signal from an operator's console; and the speeds $S_1$ and $S_2$ at the entrance and exit sides of the mill, respectively, must be measured and entered as proportional electrical signals.

In actual practice, it has been found difficult to measure the linear speeds $S_1$ and $S_2$. Generally these measurements are obtained from tachometers coupled to billy rolls on the entry and delivery sides of the stand. However, due the inertia of the billy rolls and to the slippage between the rolls and the strip, the billy rolls can never follow dynamically the minute and fast changes in the strip speed. This is especially true at the entry side where abrupt changes occur whenever a gauge change at the roll bite takes place. This factor imposes a limitation on the accuracy of gauge control systems based on the constant volume principle wherein the entrance and exit speeds of the strip are actually measured.

SUMMARY OF THE INVENTION

In accordance with the present invention, a rolling mill gauge control system based on the constant volume principle is provided for a tandem rolling mill wherein the need for taking measurements of actual strip speeds at the entrance and exit sides of a roll stand is eliminated as are the problems encountered when an attempt is made to measure such speeds with billy rolls.

Specifically, a control system based on the constant volume principle is provided for a tandem rolling mill wherein the screwdown for the first stand is controlled only by deviation readings taken beyond the bite of the rolls in an automatic gauge control feedback system. At the same time, the gauge deviation is stored until the point at which the deviation was detected reaches the bite of the rolls of the second stand. At this time (i.e., when the point reaches the second stand), calculations based upon the constant volume principle are made to adjust the spacing between the rolls of the second stand to maintain the output gauge of the second stand constant. Thus, while the gauge at the output of the first stand may vary, these variations are compensated for at a later time by the second stand.

In the embodiment of the invention shown herein, a signal proportional to percent gauge deviation from desired gauge at the output of the first stand is used (when the point at which the gauge deviation was detected reaches the bite of the second stand) to increase or decrease the delivery speed of the first stand by an amount equal to the percent gauge deviation. This, then, varies the tension in the strip between the first and second stands. A tensiometer is used to detect any variations in tension and to adjust the roll spacing between the rolls of the second stand, thereby compensating for gauge variations. At the same time, the delivery speed of the second stand is maintained constant.

Let us assume, for example, that the gauge at the output of the first stand exceeds the desired output gauge. Under these conditions, the delivery speed of the first stand is decreased which, in turn, increases the tension between the first and second stands. This increase in tension is detected by a tensiometer between the stands and used to decrease the roll spacing between the rolls in the second stand so that the tension between the stands returns to its original value; however in this process the increase in gauge detected between the stands is compensated for by the decrease in the roll spacing between the rolls in the second stand. If the gauge at the output of the first stand is below desired gauge, the foregoing process is reversed. That is, the first stand speed is increased, tension decreases, and the roll spacing of the second stand is increased to maintain tension while correcting the under-gauge condition.

The above and other objects and features of the invention will become apparent from the following detailed description taken in connection with the accompanying single figure drawing which schematically illustrates one embodiment of the invention.

With reference now to the drawing, there is shown a tandem rolling mill comprising three stands identified as stand 1, stand 2 and stand 3. Each stand is provided with a pair of upper and lower work rolls 10 and 12 and a screwdown mechanism 14 controlled by a screwdown control 16-1, 16-2 or 16-3. The rolls for each of the stands are driven by drive motors 18-1, 18-2 and 18-3 each controlled by a motor control speed regulating circuit 20-1, 20-2 and 20-3, respectively. Electrical signals proportional to the nominal or desired output gauge from the respective stands 1, 2 and 3 are derived from an operator's console 22. Thus, an electrical signal proportional to desired gauge $\overline{G_x}$ from stand 1 is applied to screwdown control 16-1; an electrical signal proportional to desired gauge $\overline{G2D}$ from stand 2 is applied to screwdown control 16-2 and an electrical signal proportional to desired gauge $\overline{G3D}$ at the output of stand 3 is applied to screwdown control 16-3.

The gauge of the entering strip material 24 being rolled is identified in the drawing as G1E; while the exit gauge from stand 1 is identified as $G_x$. Similarly, the entry gauge to stand 2 is identified as G2E; while the exit gauge from stand 2 is identified as G2D and the exit gauge from stand 3 is identified as G3D.

An electrical signal proportional to exit gauge $G_x$ from stand 1 is produced by an X-ray gauge 26 and applied to circuit 28 where it is compared with desired exit gauge $\overline{G_x}$ to determine $\Delta G_x$ which is the difference between the actual and desired gauges at the output of stand 1. $\Delta G_x$ is then divided by $G_x$ to produce an electrical signal on lead 30 proportional to the percentage gauge deviation from desired gauge. This electrical signal is applied to the screwdown control 16-1 to adjust the spacing between rolls 10 and 12 of stand 1 in a conventional gauge feedback control system. The signal on lead 30 is also applied to a delay network 32 for a purpose which will hereinafter be explained.

Between stand 1 and stand 2 is a tensiometer 34 which produces an electrical signal proportional to the tension between stand 1 and stand 2. This electrical signal is applied to a tension regulator 36 which, in turn, controls the screwdown control device 16-2 to maintain a constant tension on the strip between stand 1 and stand 2. If the tension between the stands should decrease, for example, the spacing between the rolls 10 and 12 of stand 2 will be increased to thereby increase the interstand tension. Similarly, if the tension between stand 1 and stand 2 should increase, then the spacing between rolls 10 and 12 of stand 2 will be decreased to reduce the tension between the stands. A similar tensiometer 38 and tension regulator 40 are provided for regulating the tension between stand 2 and stand 3; however this tension regulator is not concerned with the present invention.

Thus, the tension between stand 1 and stand 2 is maintained constant at all times. The automatic gauge control feedback system from gauge 26 to circuit 28 is of the "sample and hold" type due to the large transport times that exist in the entry side of the mill. Clearly, when the X-ray automatic gauge control system detects a gauge deviation and commands stand 1 to initiate a gauge correction, the strip between stand 1 and the X-ray gauge 26 has been "missed" and can never be brought to nominal gauge by the feedback control system alone. As will be seen, the system of the present invention corrects for this off-gauge material at stand 2 by introducing suitable changes in the speed of stand 1. This, in turn, varies the interstand tension which causes a change in the roll spacing of stand 2 to correct the gauge deviation. In the control system of the invention, the delivery speed of stand 2 is kept constant at all times. Hence, motor 18-2 rotates at a constant rate of speed.

For a better understanding of the system and how the correct speed for stand 1 is determined, it must be remembered that the interstand tension between stand 1 and stand 2 is maintained constant by moving the screwdown of stand 2 whenever necessary to keep the entry speed of stand 2 equal to the delivery speed of stand 1 at all times. That is, S2E must always equal S1D. The constant volume equation for stand 2 is:

$$G2E \times S2E = G2D \times S2D \qquad (3)$$

where:

G2E and G2D are the entrance and exit gauges at stand 2, and

S2E and S2D are the entrance and exit speeds at stand 2.

If $G_x$ is the gauge measured by the X-ray gauge 26, then:

$$G2E = G_x(t+T) \qquad (4)$$

where:

$G_x(t)$ is the gauge as measured by the X-ray gauge 26, and $G_x(t+T)$ is the gauge as measured by the X-ray gauge a "transport time" $T$ later.

The transport time $T$ is equal to the time required for the point at which the gauge measurement was taken to travel from the X-ray gauge 26 to the bite of the rolls 10 and 12 of stand 2. Again, due to the operation of the interstand tension regulator, the entrance speed S2E for stand 2 must be equal to the exit speed S1D of stand 1. Hence, Equation (3) above can be written as:

$$G_x(t+T) \times S1D = G2D \times S2D \qquad (5)$$

or $$G2D = (G_x(t+T) \times S1D)/S2D \qquad (6)$$

If Equation (6) is written in incremental form, the result is:

$$\Delta G2D = [\Delta G_x(t+T) \times S1D/S2D] + [G_x(t+T)(\Delta S1D/SB2D)] - [G_x(t+T)(S1D \times \Delta S2D/S2D^2)]$$

It will be remembered that the delivery speed S2D of stand 2 is constant and is not altered by either the tension regulator or the automatic gauge control system. Hence, the last term of Equation (7) vanishes and results in:

$$\Delta G2D = [\Delta G_x(t+T) \times S1D/S2D] + [G_x(t+T)(\Delta S1D/S2bD)] \quad (8)$$

Since it is desired to maintain $\Delta G2D$ equal to zero such that the output gauge from stand 2 is constant, Equation (8), under the control conditions assumed, can be written as:

$$0 = [\Delta G_x(t+T) \times S1D/S2D] + [G_x(t+T)(\Delta S1D/S2D)] \quad (9)$$

which simplifies to:

$$\Delta G_x(t+T)/G_x(t+T) = \% G_x(t+T) = -\Delta S1D/S1D$$

The foregoing Equation (10) shows that if the delivery speed of stand 1 is made to change, percentagewise, in direct proportion to the percent gauge deviation, then the gauge existing at the output of stand 2 (i.e., $G2D$) will be constant. Hence, to obtain a predictive automatic gauge control system, the following steps must be taken:

1. The percentage gauge deviation, as read by the X-ray gauge 26, should be memorized until the off-gauge material reaches stand 2.

2. When this happens, the stand 1 speed must be decreased (if the material is over-gauge) or increased (if the material is under-gauge) by an amount that is percentagewise equal to the percent gauge deviation.

It should be noted that when the stand 1 speed is decreased, there is a tendency for the tension between stand 1 and stand 2 to increase. However, the tension regulator 36 will immediately respond to this increase, moving the screws of stand 2 down to restore the tension to its original value. This occurs when the percentage gauge deviation is positive, showing that the gauge at the output of stand 1 has increased, and is compensated for by reducing the gap between the rolls of stand 2. Similarly, when the speed of stand 1 is increased in response to a decrease in gauge below the desired value, the tension between stand 1 and stand 2 decreases, but immediately the tension regulator moves the rolls of stand 2 further apart, increasing the tension and compensating for the decrease in gauge.

The control system is particularly adapted for use with computer apparatus; however, in its simplest form, it consists of a delay network 32 which delays the percentage gauge error signal from circuit 28 by an amount equal to the time required for a point on the strip 24 to travel from the X-ray gauge 26 to the bite of the rolls of stand 2. The delay network 32 may be of any suitable type such as a shift register or an operational amplifier network incorporating a motor-operated rheostat. The delay may be varied by an electrical signal on lead 42 at the output of a tachometer generator 44 coupled to the roll 12 of stand 1. This signal on lead 42 is, therefore, proportional to strip speed; and if the strip speed should vary, so also will the delay produced by the circuit 32. The delayed, percentage error signal is then multiplied in circuit 46 by a signal on lead 42 proportional to $S1D$, the delivery speed of the strip from stand 1, to produce a signal $\Delta S1D$ on lead 48 which, of course, is proportional to the variation in delivery speed from stand 1 to compensate for a variation in gauge. This signal on lead 48 is applied to the motor control speed regulator 20-1 for stand 1 such that whenever a gauge variation occurs, the speed of stand 1 is varied, either upwardly or downwardly, to compensate for the gauge variation in the manner described above.

Although the invention has been shown in connection with a certain specific embodiment, it will be readily apparent to those skilled in the art that various changes in form and arrangement of parts may be made to suit requirements without departing from the spirit and scope of the invention.

I claim as my invention:

1. In a rolling mill control system for a tandem rolling mill including at least first and second stands, the combination of:

means including a gauge detector located at a point beyond the bite of the rolls of said first stand for producing a first electrical signal which varies as a function of the difference between the actual gauge at said point and the desired output gauge from said first stand, means for producing a second electrical signal which varies as a function of the delivery speed of material from said first stand, means responsive to said first and second electrical signals for producing a third electrical signal which varies as a function of the product of the magnitude of said first and second electrical signals, means for controlling the speed at which material is delivered from said first stand as a function of variations in said third electrical signal, and means including a tensiometer device for sensing variations in tension in the material being rolled between said stands and for adjusting the spacing between the rolls of said second stand to maintain said tension constant while correcting for variations in gauge at the output of said first stand from said desired gauge.

2. The rolling mill control system of claim 1 including means for maintaining the delivery speed of material from said second stand constant at all times.

3. The rolling mill control system of claim 1 wherein the speed of said first stand is decreased when the actual gauge of material issuing from said first stand is above a predetermined desired gauge and is increased when said gauge at the output of said first stand is below said predetermined desired gauge.

4. The rolling mill control system of claim 1 wherein said first electrical signal is proportional to the percentage deviation in gauge from desired gauge.

5. The rolling mill control system of claim 1 wherein said third electrical signal is proportional to the change in speed of delivery from said first stand necessary to correct for a deviation in gauge from said desired gauge.

6. The rolling mill control system of claim 1 wherein said gauge detector is positioned between said stands, and including means for delaying said first electrical signal by an amount equal to the time required for material being rolled to travel from said gauge detector to the bite of the rolls of said second stand.

7. In a rolling mill control system for a tandem rolling mill based on the principle of constant volume of material entering and leaving a stand in the mill, the combination of means including a gauge detector located at a point beyond the bite of the rolls of a first stand in said tandem mill for producing an electrical signal which varies as a function of the speed of said first stand as well as the difference between the actual gauge at said point and the desired output gauge from said first stand, and means responsive to said electrical signal and operable upon a stand succeeding said first stand in the tandem mill for varying the spacing between the rolls of said succeeding stand to correct for a deviation in gauge from said desired gauge as detected by said gauge detector.

8. The control system of claim 7 wherein said succeeding stand is that stand immediately succeeding said first stand.

9. The control system of claim 8 wherein said last-named means includes means for maintaining the tension in the material being rolled constant between said stands.

* * * * *